(12) United States Patent
Hsieh

(10) Patent No.: US 8,364,211 B2
(45) Date of Patent: Jan. 29, 2013

(54) MOBILE PHONE AND METHOD TO ANSWER WHILE USER IS DRIVING

(75) Inventor: Yun-Chia Hsieh, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/171,474

(22) Filed: Jun. 29, 2011

(65) Prior Publication Data
US 2012/0184325 A1    Jul. 19, 2012

(30) Foreign Application Priority Data
Jan. 14, 2011   (TW) .............................. 100101382 A

(51) Int. Cl.
*H04M 1/00*     (2006.01)
(52) U.S. Cl. .................. 455/569.1; 455/550.1; 455/417
(58) Field of Classification Search ....... 455/412.1–414, 455/418–420, 456.1, 456.6, 550.1, 556.1, 455/565, 569.1–569.2; 379/82, 207.02–218.02, 379/387.01–388.02
See application file for complete search history.

(56) References Cited

U.S. PATENT DOCUMENTS

| | | | |
|---|---|---|---|
| 5,636,265 A * | 6/1997 | O'Connell et al. ......... 455/412.1 |
| 6,807,434 B1 * | 10/2004 | Yang .......................... 455/569.1 |
| 2004/0198332 A1 * | 10/2004 | Lundsgaard .................. 455/417 |
| 2005/0100140 A1 * | 5/2005 | Tsai ............................... 379/82 |
| 2008/0144805 A1 * | 6/2008 | Chew ....................... 379/387.02 |

* cited by examiner

*Primary Examiner* — Kashif Siddiqui
(74) *Attorney, Agent, or Firm* — Altis Law Group, Inc.

(57) ABSTRACT

A method executes a speed detector and a timer to answer a phone call while a user is driving. The user can set a predetermined velocity of a mobile phone and a predetermined time period to determine whether to answer the phone call while the user is driving. When the mobile phone receives the phone call, if a velocity detected from the speed detector is greater that the predetermined velocity, the timer starts to count a time. If the counted time is greater than the predetermined time period, the mobile phone answers the phone call automatically.

10 Claims, 2 Drawing Sheets

MOBILE PHONE AND METHOD TO ANSWER WHILE USER IS DRIVING

BACKGROUND

1. Technical Field

Embodiments of the present disclosure relate to mobile communications, and more particularly to a method for answering a phone call of a mobile phone while a user of the mobile phone is driving and the mobile phone thereof.

2. Description of Related Art

A user may need to answer a phone call of a mobile phone while the user is driving. However, a person answering the phone while the person is driving is creating unsafe conditions for himself and people around him. What is needed, therefore, is a method for answering the phone that overcomes the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
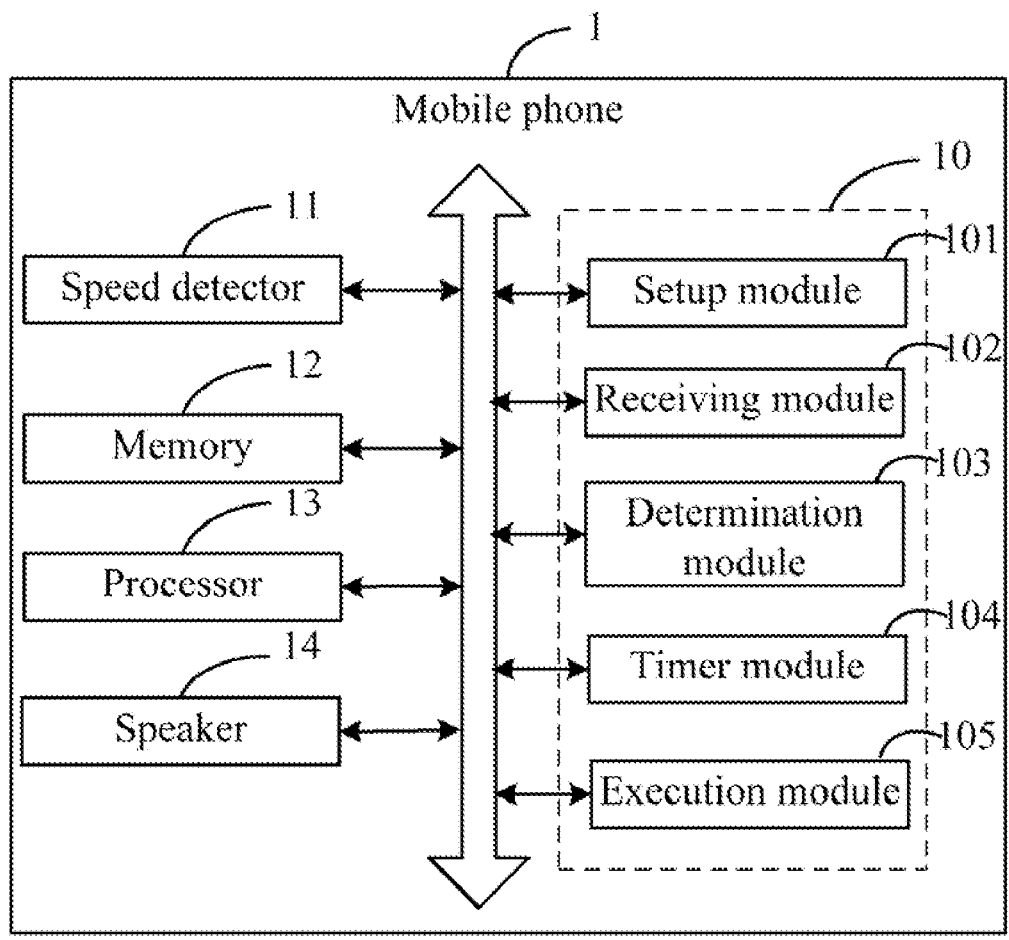
FIG. 1 is a block diagram of one embodiment of a mobile phone.

FIG. 1 is a block diagram of one embodiment of a mobile phone 1. The mobile phone 1 includes a speed detector 11, at least one processor 13, a memory 12, a speaker 14, and a system 10 including a setup module 101, a receiving module 102, a determination module 103, a timer module 104 and an execution module 105. The system 10 can set a predetermined velocity of the mobile phone 1 and a predetermined time period. The predetermined velocity and the predetermined velocity can be used to determine whether the mobile phone 1 is in a moving car when the mobile phone receives a phone call.

The mobile phone 1 is generally controlled and coordinated by an operating system software, such as UNIX, LINUX, WINDOWS, an embedded operating system, or any other compatible operating systems. In other embodiments, the mobile phone 1 may be controlled by a proprietary operating system. Conventional operating systems and schedule computer processes for execution, perform memory management, provide file system, networking, and I/O services, and provide a user interface, such as a graphical user interface (GUI), among other things.

The speed detector 11 is operable to measure a velocity of the mobile phone 1. In one embodiment, the speed detector 11 may be an acceleration sensor to measure velocity values of the mobile phone 1 positioned in a moving car.

In other embodiments, the speed detector 11 may be a GPS that calculates a current location of the mobile phone 1 based on latitude, longitude and height by trigonometric measurement which measures accurate time and distance from three or more satellites and uses three different distance values. The GPS then obtains time and distance information from three satellites and does appropriate error corrections. Accordingly, the GPS obtains speed information by continuously calculating the current location of the mobile phone 1 positioned in a moving car in real-time.

The memory 12 is operable to store many kinds of data, such as the velocity of the mobile phone 1 measured by the speed detector 11, a customization function code of the mobile phone 1, computerized codes of the system 10, programs of an operating system and other applications of the mobile phone 1. The memory 12 may include flash memory, RAM, ROM, cache, or external storage mediums.

The modules 101-105 may comprise computerized code in the form of one or more programs that are stored in the memory 12. The computerized code includes instructions that are executed by the at least one processor 13 to provide functions for modules 101-105. The at least one processor 13, as an example, may include a CPU, math coprocessor, shift register, for example.

The speaker 14 is operable to output a voice of the phone call of the mobile phone 1. In one embodiment, the mobile phone 1 switches the voice of the phone call from an inner speaker to the speaker 14 upon receiving a control signal from the execution module 105.

The setup module 101 is operable to set a predetermined velocity of the mobile phone 1 in response to answering the phone call while the car, which the mobile phone 1 is positioned in, is moving. In addition, the setup module 101 saves the set predetermined velocity in the memory 12. In one embodiment, the setup module 101 sets 10 km/h as the predetermined velocity of the mobile phone 1 in the memory 12. The predetermined velocity is set to check whether the car is moving. If the velocity of the moving car is greater than the predetermined velocity of the mobile phone 1, the system 10 determines that the mobile phone 1 is positioned in a moving car and sends a startup signal to the timer module 104. The predetermined velocity, in some embodiments, may be user configurable.

In addition, the setup module 101 further sets a predetermined time period to determine whether to answer a phone call while the car, which the mobile phone 1 is positioned in, is moving. In one embodiment, the setup module 101 sets the predetermined time period as 3 seconds. For example, when the phone call comes and rings for 3 seconds, the system 10 determines to answer the phone call. The setup module 101 further saves the predetermined time period in the memory 12.

The receiving module 102 is operable to receive the velocity of the mobile phone 1 from the speed detector 11. In one embodiment, in response to the mobile phone 1 receiving an incoming phone call, the receiving module 102 receives the velocity of the mobile phone 1 from the speed detector 11. Furthermore, the receiving module 102 saves the received velocity in the memory 12.

The determination module 103 is operable to determine whether the received velocity from the speed detector 11 is greater than the predetermined velocity. For example, if the received velocity from the speed detector 11 is greater than the predetermined velocity, the determination module 103 determines the car, that the mobile phone 1 is positioned in, is moving.

The timer module 104 is operable to start a timer to count a time when the mobile phone 1 receives the phone call upon the condition that the received velocity from the speed detector 11 is greater than the predetermined velocity. The determination module 103 is further operable to determine whether the counted time of the phone call is greater than the predetermined time period.

The execution module 105 is operable to process the phone call. In one embodiment, when the mobile phone 1 receives the phone call upon the condition that the received velocity is greater than the predetermined velocity, the timer module 104 starts to count the time of the phone call. If the counted time of the phone call is greater than the predetermined time period, the execution module 105 sends a control signal to the at least one processor 13 to answer the phone call automatically and outputs the voice of the phone call through the speaker 14.

In other embodiments, when the mobile phone receives the phone call upon the condition that the received velocity is not greater than the predetermined velocity, the execution module 105 sends a control signal to the at least one processor 13 to process the phone call by the operations of the user. For example, the operations of the user may be a cancel operation or a manual reception operation of the phone call.

Figure 2:
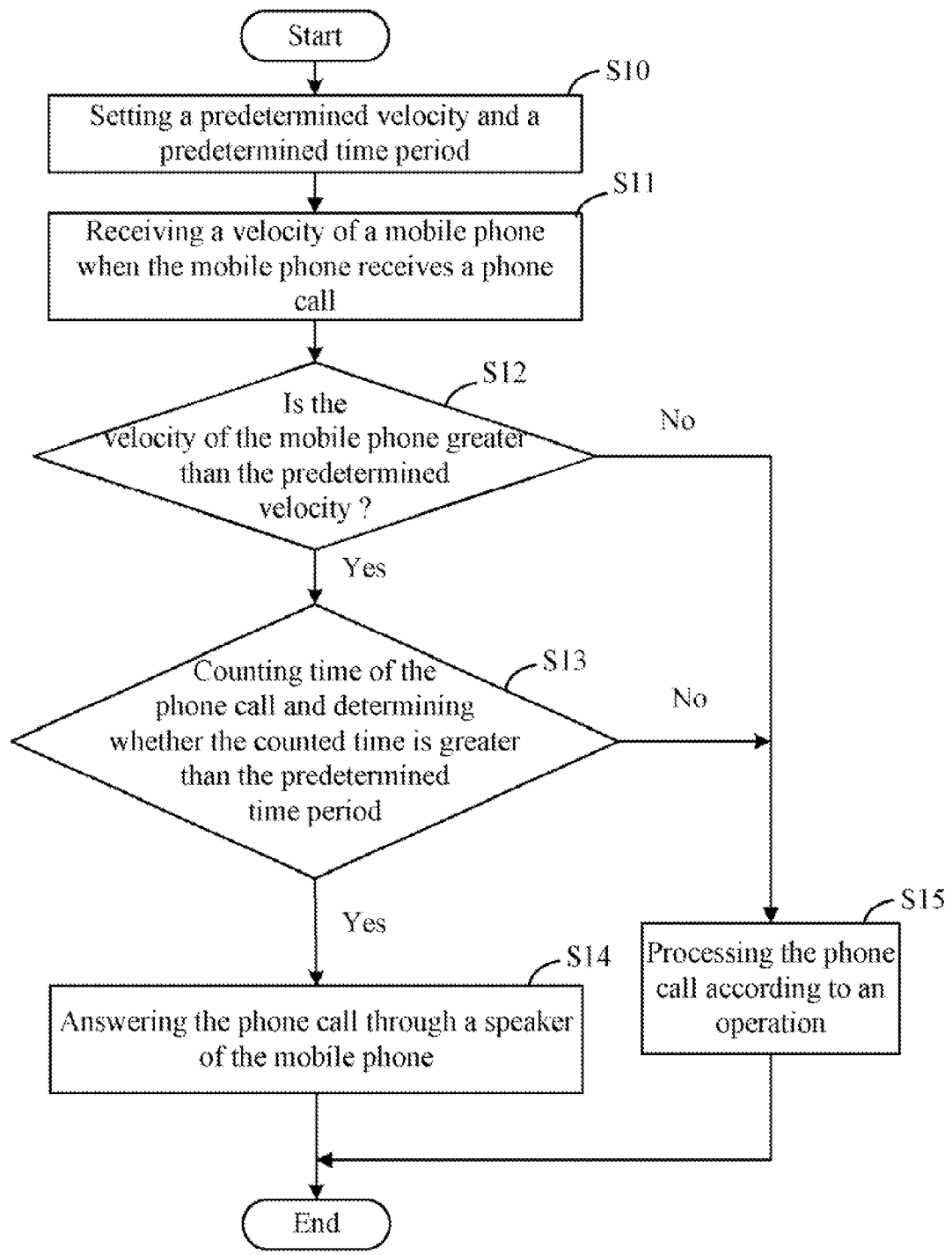
FIG. 2 is a flowchart of one embodiment of a method for answering phone call of a mobile phone.

FIG. 2 is a flowchart of one embodiment of a method for answering a phone call of a mobile phone 1. Depending on the embodiment, additional blocks may be added, others deleted, and the ordering of the blocks may be changed.

In block S10, the setup module 101 sets a predetermined velocity of the mobile phone 1 and sets a predetermined time period to determine whether to answer the phone call. The setup module 101 then saves the predetermined velocity and the predetermined time period in the memory 12.

In block S11, the receiving module 102 receives the velocity of the mobile phone 1 from the speed detector 11 in response to the mobile phone 1 receiving an incoming phone call.

In block S12, the determination module 103 determines whether the received velocity of the mobile phone 1 is greater than the predetermined velocity. If the received velocity of the mobile phone 1 is greater than the predetermined velocity, block S13 is implemented. If the received velocity of the mobile phone 1 is not greater than the predetermined velocity, block S15 is implemented.

In block S13, the timer module 104 starts a timer to count the time of the phone call and the determination module 103 determines whether the counted time of the phone call is greater than the predetermined time period. If the counted time of the phone call is greater than the predetermined time period, block S14 is implemented. If the counted time of the phone call is not greater than the predetermined time period, block S15 is implemented.

In block S14, the execution module 105 sends a control signal to the at least one processor 13 to answer the phone call automatically and to output the voice of the phone call through the speaker 14.

In block S15, the execution module 105 sends a control signal to the at least one processor 13 to process the phone call by the operations of the user. For example, the operations of the user may be a cancel operation or a manual reception operation of the phone call.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile phone, comprising:
   a memory;
   at least one processor;
   a speed detector operable to measure a velocity of the mobile phone;
   one or more programs that are stored in the memory and are executed by the at least one processor, the one or more programs comprising:
   a receiving module operable to receive the velocity of the mobile phone from the speed detector in response to the mobile phone receiving an incoming phone call;
   a determination module operable to determine whether the received velocity is greater than a predetermined velocity, and determine that the mobile phone is in a moving car and sends a startup signal to a timer module when the received velocity is greater than the predetermined velocity;
   the timer module operable to start a timer of the mobile phone to count a time when the mobile phone receives the incoming phone call; and
   an execution module operable to send a first control signal to the at least one processor to automatically answer the incoming phone call and output an audio sound of the incoming phone call through a speaker of the mobile phone if the received velocity is greater than the predetermined velocity, and send a second control signal to the at least one processor to process the incoming phone call by a manual operation of a user if the received velocity is not greater than the predetermined velocity.

2. The mobile phone of claim 1, wherein the setup module further sets a predetermined time period to determine whether to answer the incoming phone call.

3. The mobile phone of claim 1, wherein the predetermined velocity is user configurable.

4. The mobile phone of claim 1, wherein the determination module further determines whether the counted time is greater than the predetermined time period.

5. The mobile phone of claim 4, wherein the execution module further drives the speaker of the mobile phone to output the audio sound of the incoming phone call upon the condition that the counted time is greater than the predetermined time period.

6. A method to answer an incoming phone call of a mobile phone while a user of the mobile phone is driving, the mobile phone comprising a speed detector, the method comprising:
   receiving a velocity of the mobile phone from the speed detector in response to the mobile phone receiving the incoming phone call;
   determining whether the received velocity is greater than a predetermined velocity;
   determining that the mobile phone is in a moving car and sending a startup signal to a timer module when the received velocity is greater than the predetermined velocity;
   starting the timer module of the mobile phone to count a time when the mobile phone receives the incoming phone call;
   sending a first control signal to at least one processor to automatically answer the incoming phone call and outputting an audio sound of the incoming phone call through a speaker of the mobile phone if the received velocity is greater than the predetermined velocity; and sending a second control signal to the at least one processor to process the incoming phone call by a manual operation of a user if the received velocity is not greater than the predetermined velocity.

7. The method of claim 6, further comprising setting a predetermined time period to determine whether to answer the incoming phone call.

8. The method of claim 6, wherein the predetermined velocity is user configurable.

9. The method of claim 6, further comprising determining whether the counted time is greater than the predetermined time period.

10. The method of claim 9, further comprising:
driving the speaker of the mobile phone to output the audio sound of the incoming phone call upon the condition that the counted time is greater than the predetermined time period.

* * * * *